(12) United States Patent
Tsai et al.

(10) Patent No.: US 10,488,988 B2
(45) Date of Patent: Nov. 26, 2019

(54) ELECTRONIC DEVICE AND METHOD OF PREVENTING UNINTENTIONAL TOUCH

(71) Applicant: Chiun Mai Communication Systems, Inc., New Taipei (TW)

(72) Inventors: Hsueh-Tsen Tsai, New Taipei (TW); Shu-Kai Wu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/870,883

(22) Filed: Jan. 13, 2018

(65) Prior Publication Data
US 2018/0373389 A1 Dec. 27, 2018

(30) Foreign Application Priority Data
Jun. 23, 2017 (CN) .......................... 2017 1 0488595

(51) Int. Cl.
*G06F 3/041* (2006.01)
*G06F 3/0488* (2013.01)

(52) U.S. Cl.
CPC ........ *G06F 3/0418* (2013.01); *G06F 3/04886* (2013.01)

(58) Field of Classification Search
None
See application file for complete search history.

(56) References Cited

U.S. PATENT DOCUMENTS

| 9,401,984 | B1* | 7/2016 | Alameh | G06F 1/1643 |
| 2013/0181902 | A1* | 7/2013 | Hinckley | G06F 1/1684 345/168 |
| 2014/0125612 | A1* | 5/2014 | Park | G06F 3/0416 345/173 |

FOREIGN PATENT DOCUMENTS

| CN | 106855782 A | 6/2017 |
| TW | 201616292 A | 5/2016 |

* cited by examiner

*Primary Examiner* — Kenneth B Lee, Jr.
(74) *Attorney, Agent, or Firm* — ScienBiziP, P.C.

(57) ABSTRACT

A method of disregarding unintended touches applied to a handheld electronic device includes dividing a display area of a touch display into a plurality of subareas. When a touch operation is detected, the location of touch in one of the plurality of subareas is determined. A function corresponding to the operation is performed according to the one of the plurality of subareas the operation is generated in, and the method allows for simultaneous or almost simultaneous touches on other subareas being disregarded where the touches do not meet certain conditions.

15 Claims, 10 Drawing Sheets

ELECTRONIC DEVICE AND METHOD OF PREVENTING UNINTENTIONAL TOUCH

CROSS-REFERENCE TO RELATED APPLICATIONS

This application claims priority to Chinese Patent Application No. 201710488595.3 filed on Jun. 23, 2017, the contents of which are incorporated by reference herein.

FIELD

The subject matter herein generally relates to control technology, and particularly to an electronic device and a method for preventing unintentional touch on a touch display of the electronic device.

BACKGROUND

Generally, an electronic device such as a mobile phone can be operated by a user using one hand. However, if a size of the electronic device is big, when the user operates the electronic device using one hand, unintentionally touch may happen.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
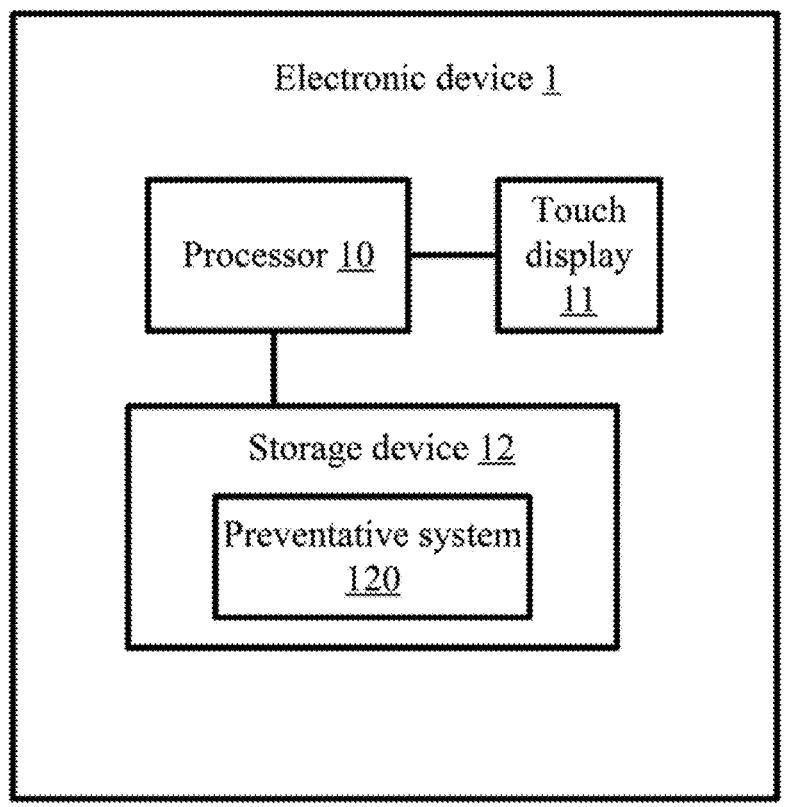
FIG. 1 illustrates a block diagram of an exemplary embodiment of an electronic device including a preventative system for protecting against unintended touches.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of an exemplary embodiment of an electronic device. Depending on the exemplary embodiment, an electronic device 1 can include, but is not limited to, at least one processor 10, a touch display 11, and a storage device 12. The at least one processor 10, the touch display 11, and the storage device 12 are electrically connected with each other. In at least one exemplary embodiment, the electronic device 1 can be a mobile phone, a tablet computer, or any suitable device.

The at least one processor 10 can be a central processing unit (CPU), a microprocessor, or any other suitable chip having data processing function.

The touch display 11 can provide an interactive interface for a user such that the user can interact with the electronic device 1.

In at least one exemplary embodiment, the storage device 12 can be an internal storage device such as a memory of the electronic device 1. In other exemplary embodiments, the storage device 12 can also be an external storage device such as a smart media card, a secure digital card, or a flash card.

Figure 2:
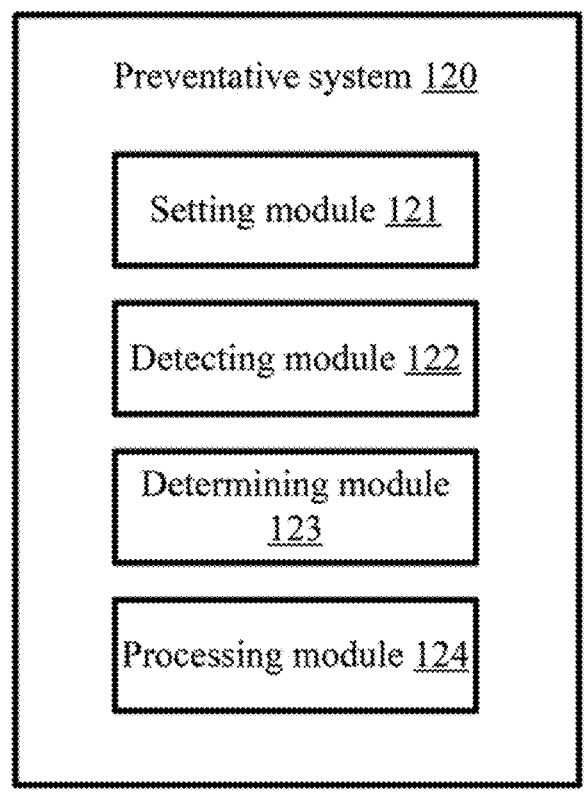
FIG. 2 illustrates a block diagram of an exemplary embodiment of modules of the preventative system of FIG. 1.

A preventative system 120 is installed in the electronic device 1. FIG. 2 illustrates a block diagram of an exemplary embodiment of modules of the preventative system 120. In at least one exemplary embodiment, the preventative system 120 can include, but is not limited to, a setting module 121, a detecting module 122, a determining module 123, and a processing module 124. The modules 121-124 include computerized codes in a form of one or more programs that may be stored in the storage device 12. The computerized codes include instructions that can be executed by the at least one processor 10.

Figure 3:
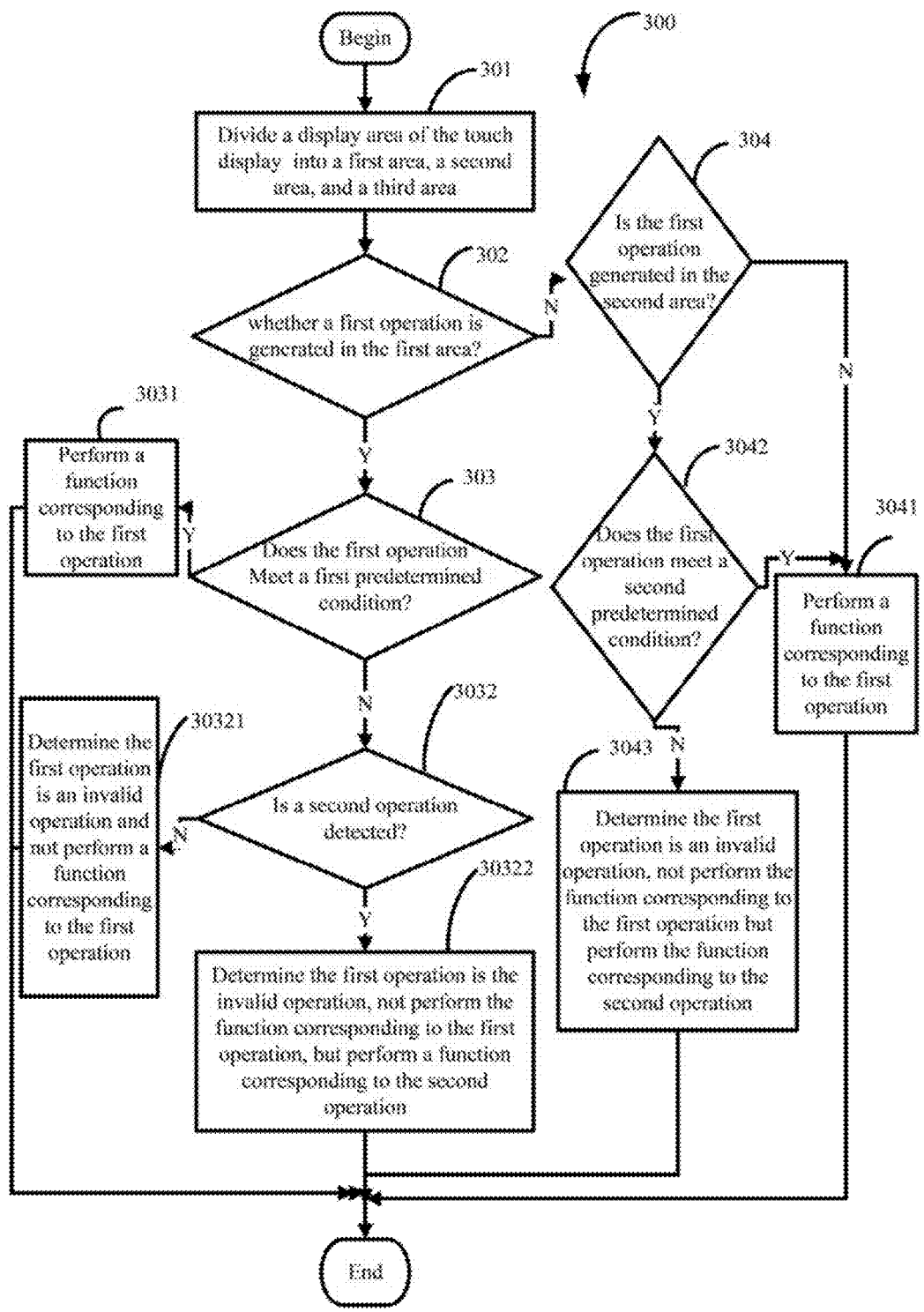
FIG. 3 illustrates a flow chart of an exemplary embodiment of a method of disregarding unintended touch.

FIG. 3 illustrates a flowchart which is presented in accordance with an example embodiment. The exemplary method 300 is provided by way of example, as there are a variety of ways to carry out the method. The method 300 described below can be carried out using the configurations illustrated in FIG. 1, for example, and various elements of these figures are referenced in explaining exemplary method 300. Each block shown in FIG. 3 represents one or more processes, methods, or subroutines, carried out in the exemplary method 300. Additionally, the illustrated order of blocks is by example only and the order of the blocks can be changed. The exemplary method 300 can begin at block 301. Depending on the embodiment, additional steps can be added, others removed, and the ordering of the steps can be changed.

At block 301, the setting module 121 can divide a display area of the touch display 11 into a plurality of subareas.

In at least one exemplary embodiment, the setting module 121 can divide the display area of the touch display 11 into the plurality of subareas in response to user input. For example, the setting module 121 can provide a user interface and receive a number "N" input by the user through the user interface. The setting module 121 then divides the display area of the touch display 11 into N number of subareas. For example, N may equal 3, 5, or 6.

Figure 4A:
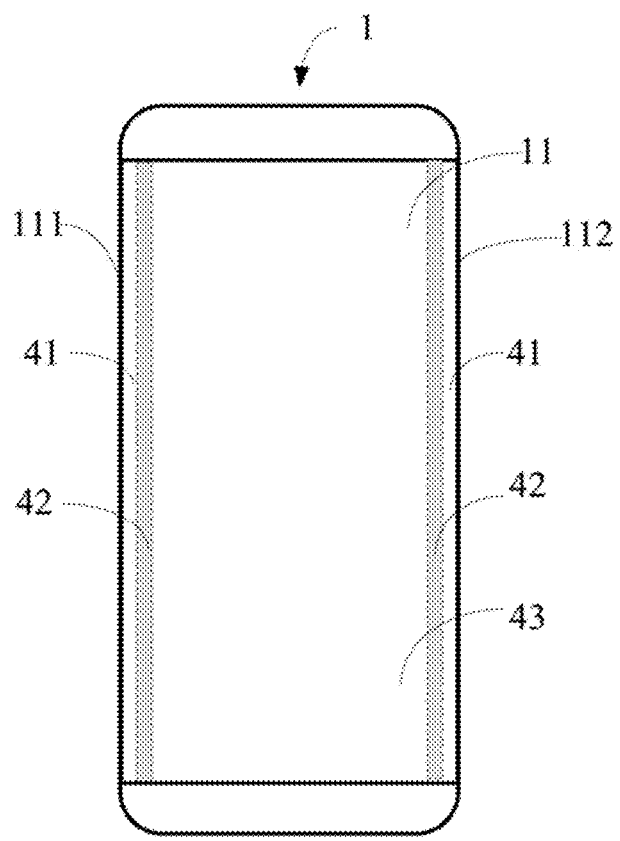
FIG. 4A illustrates a first exemplary embodiment of dividing a display area of the electronic device of FIG. 1 into a plurality of sub areas.

In at least one exemplary embodiment, as shown in FIG. 4A, the plurality of subareas includes a first area 41, a second area 42, and a third area 43. To clearly illustrate the present disclosure, the second area 42 as shown in FIG. 4A is colored in gray.

In at least one exemplary embodiment, as shown in FIG. 4A, the first area 41 comprises a left area located at a left margin 111 of the touch display 11 and a right area located at a right margin 112 of the touch display 11. Both the left area and the right area of the first area 41 have a common predetermined shape and a common predetermined size. For example, each of the left area and the right area is a rectangular region having the same predetermined length and the same predetermined width. The predetermined length may be equal to a length of the display area of the touch display 11, and the predetermined width may be equal to $1/8$ or $1/16$ of a width of the display area of the touch display 11.

In at least one exemplary embodiment, the second area 42 is adjacent to the first area 41. The third area 43 is adjacent to the second area 42. The second area 42 is located between the first area 41 and the third area 43. In other words, the first area 41 is not adjacent to the third area 43. The third area 43 is an area of the display area of the touch display 11 but excluding the first area 41 and the second area 42. In at least one exemplary embodiment, the second area 42 has a predetermined shape and a predetermined size. For example, the second area 42 comprises two rectangular regions having the same predetermined length and the same predetermined width as those of the first area 41. In other exemplary embodiments, the second area 42 has a predetermined shape and a predetermined size different from those of the first area 41.

Figure 4B:
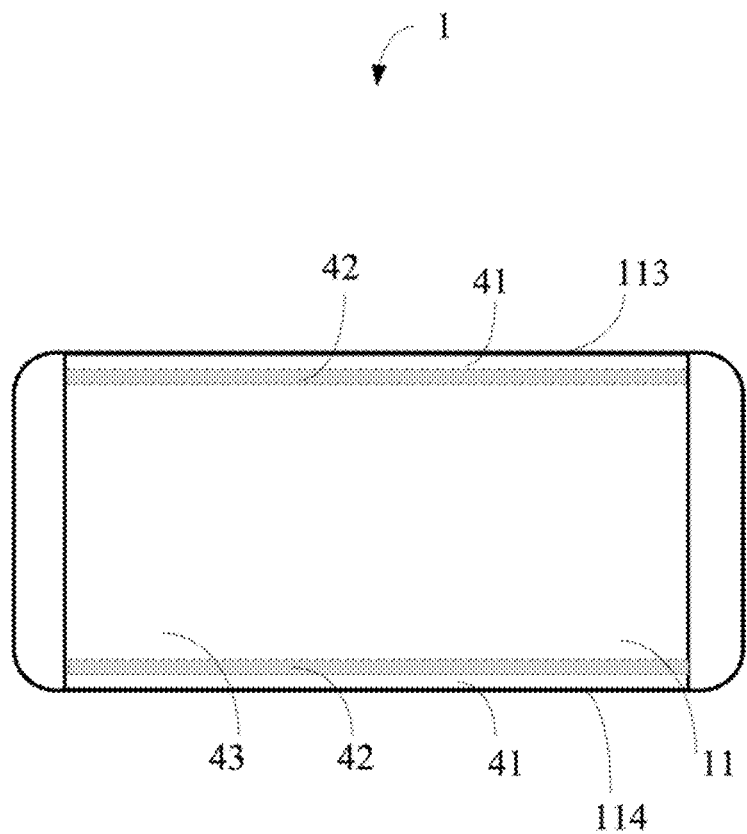
FIG. 4B illustrates a second exemplary embodiment of dividing the display area of the electronic device of FIG. 1 into sub areas.

In other exemplary embodiments, as shown in FIG. 4B, the first area 41 comprises a top area located at a top margin 113 of the touch display 11 and a bottom area located at a bottom margin 114 of the touch display 11. Both the top area and the bottom area of the first area 41 have a common predetermined shape and a common predetermined size.

For example, as shown in FIG. 4B, the second area 42 is adjacent to the first area 41. The third area 43 is adjacent to the second area 42. The second area 42 is located between the first area 41 and the third area 43. In other words, the first area 41 is not adjacent to the third area 43. The third area 43 can be an area of the display area of the touch display 11 excluding the first area 41 and the second area 42. In at least one exemplary embodiment, the second area 42 has the same predetermined shape and size as those of the first area 41. In other exemplary embodiments, the second area 42 has a predetermined shape and a predetermined size different from those of the first area 41.

Figure 4C:
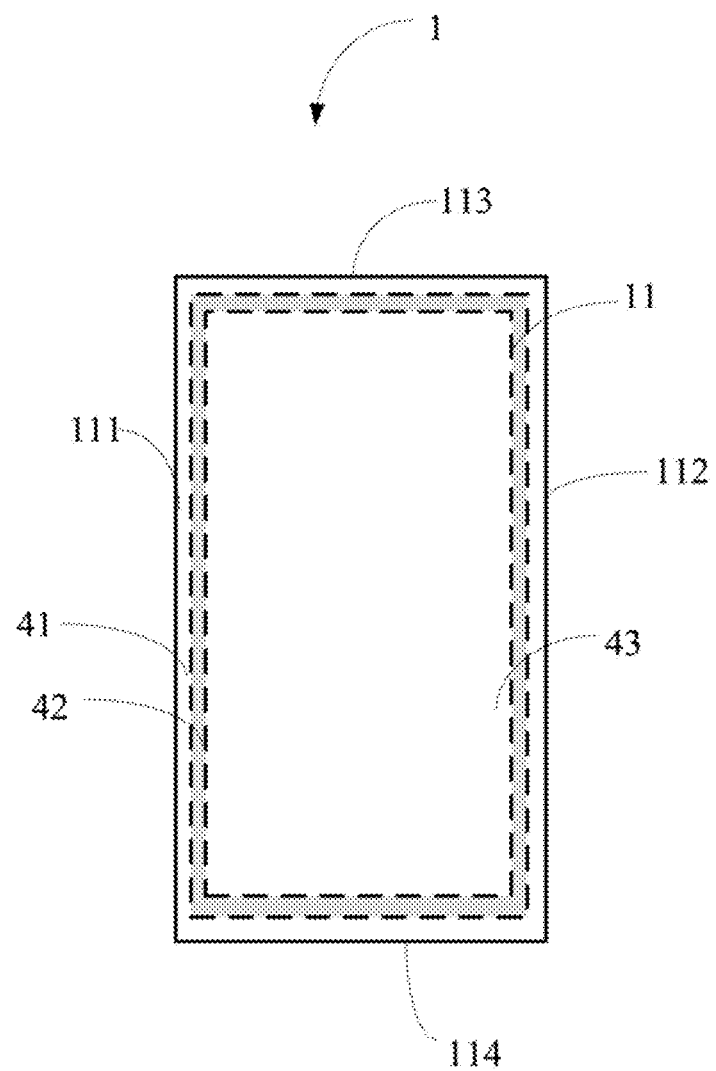
FIG. 4C illustrates a third exemplary embodiment of dividing the display area of the electronic device of FIG. 1 into sub areas.

In other exemplary embodiments, as shown in FIG. 4C, the first area 41 can be an annular region that includes the left margin 111, right margin 112, top margin 113, and bottom margin 114.

For example, as shown in FIG. 4C, the second area 42 can also be an annular region. The second area 42 is adjacent to the first area 41. The third area 43 is adjacent to the second area 42. The second area 42 is located between the first area 41 and the third area 43. The first area 41 is not adjacent to the third area 43. The third area 43 is an area of the display area of the touch display 11 excepting the first area 41 and the second area 42. In at least one exemplary embodiment, the electronic device 1 is a full screen device.

The plurality of subareas can also be predetermined when the programmer develops the preventative system 120. In other words, block 301 can be omitted.

At block 302, the detecting module 122 can detect an operation (hereinafter referred as "first operation") that is generated on the touch display 11. When the first operation is detected, the determining module 123 can determine whether the first operation is generated on the first area 41. When the first operation is generated on the first area 41, the process goes to block 303. When the first operation is not generated on the first area 41, the process goes to block 304.

In at least one exemplary embodiment, when the first operation is partly generated in the first area 41, the determining module 123 can determine that the first operation is generated in the first area 41. The first operation partly generated in the first area 41 means that a touch area corresponding to the first operation overlaps with the first area 41 and at least one of the second area 42 and the third area 43.

At block 303, when the first operation is generated in the first area 41, the determining module 123 can determine whether or not the first operation meets a first predetermined condition. When the first operation does meet the first predetermined condition, the process goes to block 3031. When the first operation does not meet the first predetermined condition, the process goes to block 3032.

In at least one exemplary embodiment, when the first operation is a predetermined operation generated in the first area 41, the determined module 123 can determine that the first operation does meet the first predetermined condition. For example, the first predetermined operation can be a sliding operation such as an operation of sliding from up towards down or an operation of sliding from left to right generated in the first area 41.

For example, when the first operation is the operation of sliding from up towards down and is generated in the first area 41, the determining module 123 can determine that the first operation meets the first predetermined condition. Then the process goes to block 3031.

For another example, when the first operation is an operation of single-point touch or a long press generated only in the first area 41, the determining module 123 can determine that the first operation does not meet the first predetermined condition. Then the process goes to block 3032.

At block 3031, when the first operation meets the first predetermined condition, the processing module 124 can determine that the first operation is a valid operation and can respond to the first operation. In other words, the processing module 124 can perform a function corresponding to the first operation when the first operation is determined to be the valid operation.

For example, one page of an electronic book being currently displayed on the touch display 11, when the first operation is an operation of sliding from right to left in the first area 41 and that operation is applied, the processing module 124 can determine that the first operation is the valid operation and can switch the one page to a next page of the electronic book.

At block 3032, when the first operation does not meet the first predetermined condition, the determining module 123 can determine whether another operation (hereinafter referred as "second operation") is detected by the detecting module 122. When the second operation is not detected, the process goes to block 30321. When the second operation is detected, the process goes to block 30322.

In at least one exemplary embodiment, the second operation can be an operation that is generated after the first operation is detected.

In other exemplary embodiments, the second operation can be an operation that is generated in a first predetermined time period beginning from the moment when the first operation is detected. For example, the second operation can be an operation that is generated in five minutes beginning from the moment when the first operation is detected.

At block 30321, the processing module 124 can determine that the first operation is an invalid operation and not respond to the first operation. In other words, the processing module 124 does not perform any function corresponding to the first operation.

At block 30322, the processing module 124 can determine that the first operation is an invalid operation. The processing module 124 does not respond to the first operation but does respond to the second operation. In other words, the processing module 124 does not perform the function corresponding to the first operation, but performs a function corresponding to the second operation.

In at least one exemplary embodiment, when the first operation is determined to be the invalid operation, the processing module 124 does not respond to a touch operation which meets a certain condition. Such certain condition can include the touch operation being generated in a second predetermined time period (e.g., two seconds) beginning from the moment when the first operation is detected. In at least one exemplary embodiment, the certain condition may further include the touch operation being generated within a predetermined distance (e.g., 1 centimeter) from a touch position corresponding to the first operation. In at least one exemplary embodiment, the touch operation can be a single-point touch operation or a multi-point touch operation.

In other exemplary embodiments, when the processing module 124 determines that the first operation is an invalid operation and responds to the second operation, and the second operation is continuously detected by the detecting module 122, the processing module 124 does not respond to a touch operation, wherever the touch operation is generated, when the touch operation meets the aforementioned certain condition.

Figure 5:
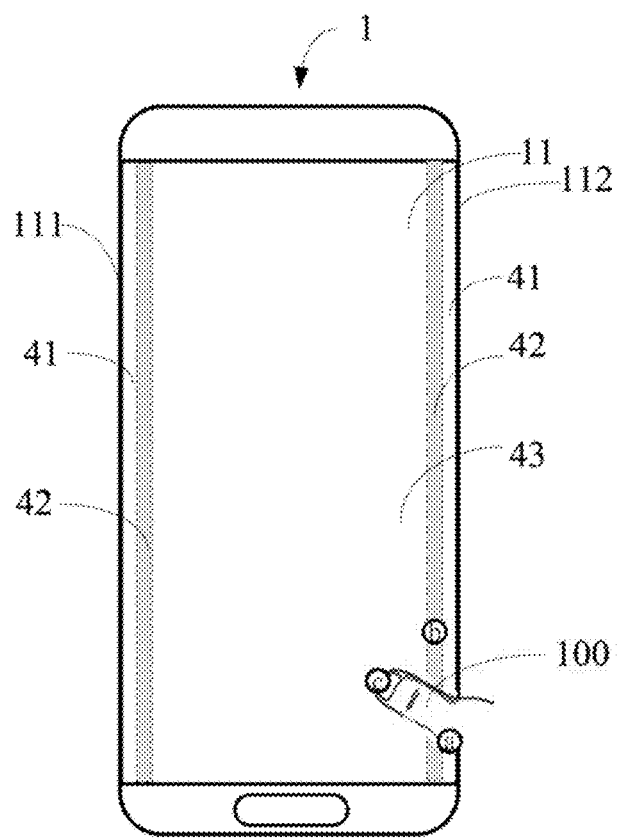
FIGS. 5-6 illustrates examples of touch operations in different sub areas.

To clearly illustrate the present disclosure, an example is shown in FIG. 5. It is assumed that a finger 100 of a user is applying a long press (e.g., two seconds) at a position "a" located in the first area 41. In the first predetermined time period that begins from the first operation of a long press on the position "a" being detected, the finger 100 touches a position "b" located in the second area 42 or touches a position "c" located in the third area 43. According to the above steps, the detecting module 22 can detect the first operation of long pressing on the position "a" at block 302. Because the first operation of long pressing on the position "a" is generated in the first area 41, then the process goes to block 303, and because the first operation of long pressing on the position "a" does not meet the first predetermined condition, the process then goes to block 3032. At block 3032, the detecting module 122, in the first predetermined time period, further detects the second operation of touching the position "b" or "c" after the first operation of long pressing on the position "a" is detected, and the process then goes to block 30322. At block 30322, the processing module 124 determines that the first operation of long pressing on the position "a" is the invalid operation. The processing module 124 does not respond to the first operation of long pressing on the position "a" but responds the second operation of touching the position "b" or "c". For example, a certain page of an electronic book being currently displayed on the touch display 11, the processing module 124 can open a hyperlink located at the position "b" or "c".

In at least one exemplary embodiment, when the processing module 124 determines that the first operation of long pressing on the position "a" is the invalid operation, the processing module 124 does not respond to a touch operation which is generated in the second predetermined time period when a distance between a touch position of the touch operation and the position "a" is less than the predetermined value. For example, the processing module 124 does not respond to a touch operation that is generated within two seconds when the distance between the touch position of the touch operation and the position "a" is less than one centimeter. In other words, the processing module 124 does not perform a function corresponding to the touch operation.

In other exemplary embodiments, when the processing module 124 determines that the first operation of long pressing on the position "a" is the invalid operation, and the processing module 124 responds to the second operation of touching the position "b" or "c" (the second operation of touching the position "b" or "c" being continuously detected by the detecting module 122), the processing module 124 does not respond to a touch operation generated in the second predetermined time period when the distance between the touch position of the touch operation and the position "a" is less than one centimeter. In other words, the processing module 124 does not perform a function corresponding to the touch operation.

At block 304, the determining module 123 can determine whether the first operation is generated in the second area 42. When the first operation is not generated in the second area 42, the process goes to block 3041. When the first operation is generated in the second area 42, the process goes to block 3042.

In at least one exemplary embodiment, when the first operation is partly generated in the second area 42, the determining module 123 can determine that the first operation is generated in the second area 42. The first operation partly generated in the second area 42 means that a touch area corresponding to the first operation overlaps with the second area 42 and the third area 43.

At block 3041, when the first operation is not generated in the second area 42, the processing module 124 can determine that the first operation is generated in the third area 43 and can determine the first operation is a valid operation. The processing module 124 can respond to the first operation. In other words, the processing module 124 can perform a function corresponding to the first operation.

At block 3042, when the first operation is generated in the second area 42, the determining module 123 can determine whether or not the first operation meets a second predetermined condition. When the first operation meets the second predetermined condition, the process goes to block 3041.

When the first operation does not meet the second predetermined condition, the process goes to block 3043.

In at least one exemplary embodiment, the second predetermined condition includes that the detecting module 122 does not detect the second operation. In at least one exemplary embodiment, when the detecting module 122 detects the occurrence of second operation, the determining module 123 determines that the first operation does not meet the second predetermined operation.

In at least one exemplary embodiment, the second operation can be an operation that is generated after the first operation is detected.

In other exemplary embodiments, the second operation can be an operation that is generated in the first predetermined time period beginning from the moment when the first operation is detected. For example, the second operation can be an operation that is generated in five minutes that is calculated begin from the first operation is detected.

At block 3043, the processing module 124 can determine that the first operation is an invalid operation and not respond to the first operation. The processing module 124 can respond to the second operation. In other words, the processing module 124 does not perform the function corresponding to the first operation and can instead perform the function corresponding to the second operation.

In at least one exemplary embodiment, when the first operation is determined to be the invalid operation, the processing module 124 does not respond to any touch operation, no matter generated in which area, when the touch operation meets the aforementioned certain condition.

In other exemplary embodiments, when the processing module 124 determines that the first operation is an invalid operation and responds to the second operation, and the second operation is continuously detected by the detecting module 122, the processing module 124 does not respond to a touch operation wherever generated when the touch operation meets the aforementioned certain condition.

Figure 6:
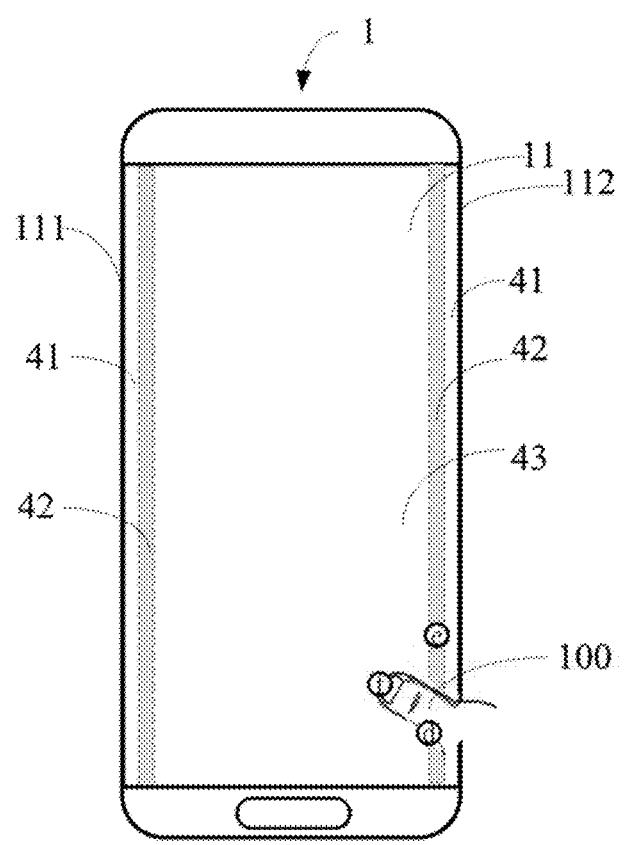

To illustrate, as shown in FIG. 6, it is assumed that the finger 100 of the user touches a position "d" that is simultaneously located in the second area 42 and the third area 43. In the first predetermined time period beginning from the moment when the first operation of touching the position "d" is detected, the finger 100 touches a position "e" only located in the second area 42 or touches a position "f" only located in the third area 43. According to the above steps, at block 302, the detecting module 22 can determine that the first operation of touching the position "d" is not generated in the first area 41. The process then goes to block 304. Because the first operation of touching the position "d" is partly generated in the second area 42, the determining module 123 determines that the first operation of touching the position "d" is generated in the second area 42, then the process goes to block 3042 after the block 304 is executed. At block 3042, the detecting module 122, within the first predetermined time period, further detects the second operation of touching the position "e" or "f" after the first operation of touching the position "d" is detected, and the process then goes to block 3043. At block 3043, the processing module 124 determines that the first operation of touching the position "d" is an invalid operation. The processing module 124 does not respond to the first operation of touching the position "d" but responds to the second operation of touching the position "e" or "f". For example, a certain page of an electronic book being currently displayed on the touch display 11, the processing module 124 can open a hyperlink at the position "e" or "f".

In at least one exemplary embodiment, when the processing module 124 determines that the first operation of touching the position "d" is an invalid operation, the processing module 124 does not respond to a touch operation which is generated in the second predetermined time period when a distance between a touch position of the touch operation and the position "d" is less than the predetermined value. For example, the processing module 124 does not respond to a touch operation that is generated within two seconds when the distance between the touch position of the touch operation and the position "d" is less than one centimeter. In other words, the processing module 124 does not perform a function corresponding to the touch operation.

In other exemplary embodiments, when the processing module 124 determines that the first operation of touching the position "d" is an invalid operation, and responds to the second operation of touching the position "e" or "f", and the second operation of touching the position "e" or "f" is continuously detected by the detecting module 122, the processing module 124 does not respond to a touch operation generated within the second predetermined time period when the distance between the touch position of the touch operation and the position "d" is less than one centimeter. In other words, the processing module 124 does not perform a function corresponding to the touch operation.

It should be noted that each of the positions "a", "b", "c", "d", "e", and "f" can be an area having a same or a different size. In other words, each of the positions "a", "b", "c", "d", "e", and "f" can be a point or an area having a predetermined size.

Figure 7:
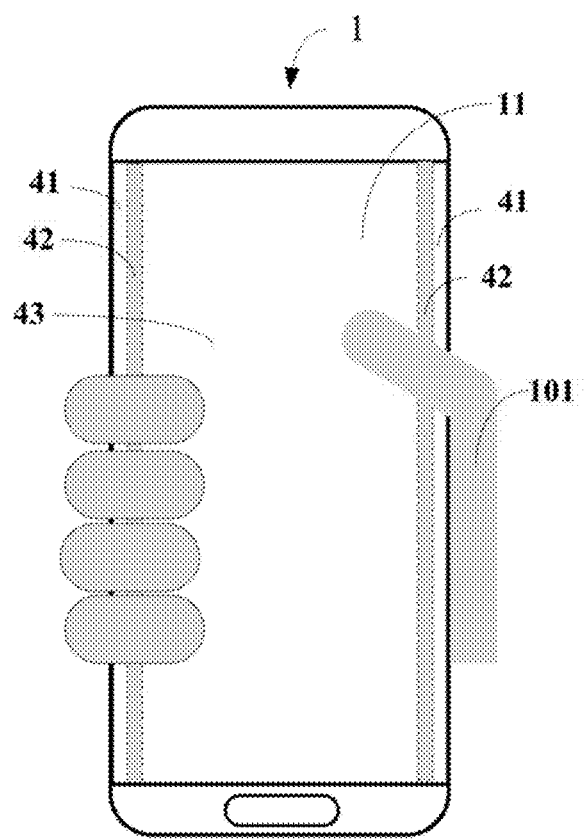
FIG. 7 illustrates an example of a user holding the electronic device of FIG. 1 using his right hand.

For example, as shown in FIG. 7, when the user 100 holds the electronic device 1 in the right hand 101, five fingers of the right hand 101 simultaneously touch the first area 41, each of the five fingers corresponds to an area of the display area of the touch display 11. Upon launch of the preventative system 120, the electronic device 1 does not respond to an operation of the each finger simultaneously touching the first area 41.

Figure 8:
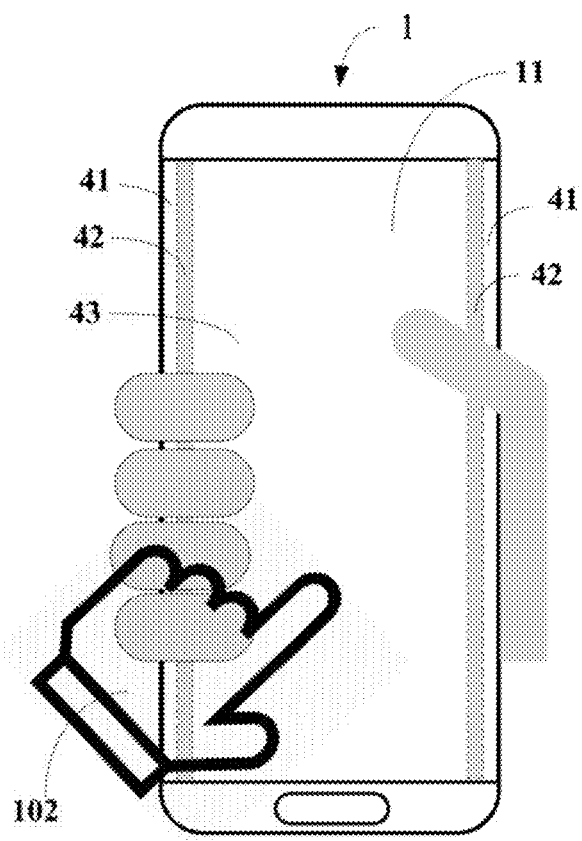
FIG. 8 illustrates an example of the user holding the electronic device of FIG. 1 using his right hand and operating the electronic device using his left hand.

As shown in FIG. 8, when the user holds the electronic device 1 in the right hand 101, the user may operate in the third area 43 using left hand 102. If the preventative system 120 is launched, the electronic device 1 does not respond to an operation that is generated by the right hand 101, instead responding to a touch operation that is generated by the left hand 102.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
   a touch display;
   at least one processor; and
   a storage device;
   the storage device storing computerized instructions, which when executed by the at least one processor, cause the at least one processor to:
   divide a display area of the touch display into a first area, a second area, and a third area, wherein the first area is an annular region that includes a left margin, a right margin, a top margin, and a bottom margin of the touch display, the second area is an annular region and is adjacent to the first area, the third area is adjacent to the second area, the second area is located between the first area and the third area, the first area is not adjacent to the third area;

detect operations on the touch display;

determine, when a first operation is detected, whether the first operation is generated in the first area, the second area, or the third area;

determine whether the first operation meets a first predetermined condition when the first operation is generated in the first area;

perform a function corresponding to the first operation when the first operation meets the first predetermined condition and not perform the function corresponding to the first operation when the first operation does not meet the first predetermined condition;

determine whether the first operation meets a second predetermined condition when the first operation is generated in second area, wherein the second predetermined condition is different from the first predetermined condition, the second predetermined condition is that no detection of a second operation within a first predetermined time period beginning from a time when the first operation is detected;

perform the function corresponding to the first operation when the first operation meets the second predetermined condition and not perform the function corresponding to the first operation when the first operation does not meet the second predetermined condition; and perform the function corresponding to the first operation when the first operation is generated in the third area.

2. The electronic device according to claim 1, wherein the first predetermined condition comprises that the first operation is a predetermined operation that is generated in the first area.

3. The electronic device according to claim 1, wherein the determining of whether the first operation is generated in the first area, the second area, or the third area comprises:

determining whether the first operation is generated in the first area, wherein when the first operation is partly generated in the first area, the first operation is determined to be generated in the first area;

determining, when the first operation is not generated in the first area, whether the first operation is generated in the second area, wherein the first operation is determined to be generated in the second area when the first operation is partly generated in the second area; and determining the first operation is generated in the third area when the first operation is neither generated in the first area nor generated in the second area.

4. The electronic device according to claim 3, wherein the first operation partly generated in the first area means that a touch area corresponding to the first operation overlaps with the first area and at least one of the second area and the third area;

the first operation partly generated in the second area means that the touch area corresponding to the first operation overlaps with the second area and the third area.

5. The electronic device according to claim 1, wherein when the at least one processor does not perform the function corresponding to the first operation, the at least one processor does not perform a function corresponding to a touch operation when the touch operation meets a certain condition, the certain condition includes that the touch operation is generated in a second predetermined time period beginning from the moment when the first operation is detected and the touch operation is generated within a predetermined distance from a touch position of the first operation.

6. A method of preventing unintentional touch applied to an electronic device comprising a touch display, the method comprising:

dividing a display area of the touch display into a first area, a second area, and a third area, wherein the first area is an annular region that includes a left margin, a right margin, a top margin, and a bottom margin of the touch display, the second area is an annular region and is adjacent to the first area, the third area is adjacent to the second area, the second area is located between the first area and the third area, the first area is not adjacent to the third area;

detecting operations on the touch display;

determining, when a first operation is detected, whether the first operation is generated in the first area, the second area, or the third area;

determining whether the first operation meets a first predetermined condition when the first operation is generated in the first area;

performing a function corresponding to the first operation when the first operation meets the first predetermined condition and not performing the function corresponding to the first operation when the first operation does not meet the first predetermined condition;

determining whether the first operation meets a second predetermined condition when the first operation is generated in second area, wherein the second predetermined condition is different from the first predetermined condition, the second predetermined condition is that no detection of a second operation within a first predetermined time period beginning from a time when the first operation is detected;

performing the function corresponding to the first operation when the first operation meets the second predetermined condition and not performing the function corresponding to the first operation when the first operation does not meet the second predetermined condition; and performing the function corresponding to the first operation when the first operation is generated in the third area.

7. The method according to claim 6, wherein the first predetermined condition comprises that the first operation is a predetermined operation that is generated in the first area.

8. The method according to claim 6, wherein the determining of whether the first operation is generated in the first area, the second area, or the third area comprises:

determining whether the first operation is generated in the first area, wherein when the first operation is partly generated in the first area, the first operation is determined to be generated in the first area;

determining, when the first operation is not generated in the first area, whether the first operation is generated in the second area, wherein the first operation is determined to be generated in the second area when the first operation is partly generated in the second area; and determining the first operation is generated in the third area when the first operation is neither generated in the first area nor generated in the second area.

9. The method according to claim 8, wherein the first operation partly generated in the first area means that a touch area corresponding to the first operation overlaps with the first area and at least one of the second area and the third area; the first operation partly generated in the second area means that the touch area corresponding to the first operation overlaps with the second area and the third area.

10. The method according to claim 6, wherein when the electronic device does not perform the function corresponding to the first operation, the electronic device does not perform a function corresponding to a touch operation when the touch operation meets a certain condition, the certain condition includes that the touch operation is generated in a second predetermined time period beginning from the moment when the first operation is detected and the touch operation is generated within a predetermined distance from a touch position of the first operation.

11. A non-transitory storage medium having stored thereon instructions that, when executed by a processor of an electronic device, cause the processor to perform a method of preventing unintentional touch on a touch display of the electronic device, wherein the method comprises:
   dividing a display area of the touch display into a first area, a second area, and a third area, wherein the first area is an annular region that includes a left margin, a right margin, a top margin, and a bottom margin of the touch display, the second area is an annular region and is adjacent to the first area, the third area is adjacent to the second area, the second area is located between the first area and the third area, the first area is not adjacent to the third area;
   detecting operations on the touch display;
   determining, when a first operation is detected, whether the first operation is generated in the first area, the second area, or the third area;
   determining whether the first operation meets a first predetermined condition when the first operation is generated in the first area;
   performing a function corresponding to the first operation when the first operation meets the first predetermined condition and not performing the function corresponding to the first operation when the first operation does not meet the first predetermined condition;
   determining whether the first operation meets a second predetermined condition when the first operation is generated in second area, wherein the second predetermined condition is different from the first predetermined condition, the second predetermined condition is that no detection of a second operation within a first predetermined time period beginning from a time when the first operation is detected;
   performing the function corresponding to the first operation when the first operation meets the second predetermined condition and not performing the function corresponding to the first operation when the first operation does not meet the second predetermined condition; and
   performing the function corresponding to the first operation when the first operation is generated in the third area.

12. The non-transitory storage medium according to claim 11, wherein the first predetermined condition comprises that the first operation is a predetermined operation that is generated in the first area.

13. The non-transitory storage medium according to claim 11, wherein the determining of whether the first operation is generated in the first area, the second area, or the third area comprises:
   determining whether the first operation is generated in the first area, wherein when the first operation is partly generated in the first area, the first operation is determined to be generated in the first area;
   determining, when the first operation is not generated in the first area, whether the first operation is generated in the second area, wherein the first operation is determined to be generated in the second area when the first operation is partly generated in the second area; and
   determining the first operation is generated in the third area when the first operation is neither generated in the first area nor generated in the second area.

14. The non-transitory storage medium according to claim 13, wherein the first operation partly generated in the first area means that a touch area corresponding to the first operation overlaps with the first area and at least one of the second area and the third area; the first operation partly generated in the second area means that the touch area corresponding to the first operation overlaps with the second area and the third area.

15. The non-transitory storage medium according to claim 11, wherein when the electronic device does not perform the function corresponding to the first operation, the electronic device does not perform a function corresponding to a touch operation when the touch operation meets a certain condition, the certain condition includes that the touch operation is generated in a second predetermined time period beginning from the moment when the first operation is detected and the touch operation is generated within a predetermined distance from a touch position of the first operation.

* * * * *